(12) United States Patent
Browne et al.

(10) Patent No.: US 12,407,578 B2
(45) Date of Patent: Sep. 2, 2025

(54) FAILURE REDUCTION SYSTEM FOR COMMUNICATION NETWORK

(71) Applicant: Intel Corporation, Santa Clara, CA (US)

(72) Inventors: John J. Browne, Limerick (IE); Chris M. MacNamara, Ballyclough (IE)

(73) Assignee: Intel Corporation, Santa Clara, CA (US)

(*) Notice: Subject to any disclaimer, the term of this patent is extended or adjusted under 35 U.S.C. 154(b) by 761 days.

(21) Appl. No.: 17/517,601

(22) Filed: Nov. 2, 2021

(65) Prior Publication Data

US 2022/0060391 A1 Feb. 24, 2022

(51) Int. Cl.
*H04L 41/16* (2022.01)
*H04L 41/0654* (2022.01)
*H04L 41/08* (2022.01)

(52) U.S. Cl.
CPC .......... *H04L 41/16* (2013.01); *H04L 41/0654* (2013.01); *H04L 41/0886* (2013.01)

(58) Field of Classification Search
CPC .. H04L 41/16; H04L 41/0654; H04L 41/0886
USPC ....................................................... 709/223
See application file for complete search history.

(56) References Cited

U.S. PATENT DOCUMENTS

| | | | |
|---|---|---|---|
| 10,928,807 B2* | 2/2021 | Rashidi | G05B 13/0265 |
| 12,067,376 B2* | 8/2024 | Nayak | G06F 9/543 |
| 2015/0199630 A1 | 7/2015 | Pfeiffer et al. | |
| 2022/0035903 A1* | 2/2022 | Kim | B25J 9/1656 |
| 2022/0198562 A1* | 6/2022 | Cella | G06Q 40/04 |
| 2022/0253426 A1* | 8/2022 | Zhu | G06N 3/044 |
| 2022/0357940 A1* | 11/2022 | Crane | G06F 11/3089 |
| 2024/0378506 A1* | 11/2024 | D'Oro | G06N 20/00 |

FOREIGN PATENT DOCUMENTS

WO 2021165976 A1 8/2021

OTHER PUBLICATIONS

EPO Extended European Search Report in EP Application Serial No. 22201183.5-1216 mailed on Mar. 14, 2023 (13 pages).
Ganesan, Rajeshwari et al., "The Case for Failsafe Protocols in AI Based Automation Deployments, Humans are still needed in the loop," edgeverve, Jan. 2021 (5 pages).

* cited by examiner

*Primary Examiner* — Lan Dai T Truong
(74) *Attorney, Agent, or Firm* — Alliance IP, LLC

(57) ABSTRACT

In one embodiment, a method comprises determining whether an automation recommendation for a network is to be forwarded to a management system of the network, wherein the automation recommendation specifies an action to take with respect to a plurality of platforms of the network and is received from a recommendation system utilizing artificial intelligence to generate the automation recommendation; responsive to a determination to forward the automation recommendation, assessing an impact of the automation recommendation; and performing an action with respect to the automation recommendation based on the impact.

22 Claims, 9 Drawing Sheets

FAILURE REDUCTION SYSTEM FOR COMMUNICATION NETWORK

BACKGROUND

A communication network may include one or more components that comprise processing circuitry and memory modules. The network components may communicate with each other over the communication network.

BRIEF DESCRIPTION OF THE DRAWINGS

Like reference numbers and designations in the various drawings indicate like elements.

DETAILED DESCRIPTION

Figure 1:
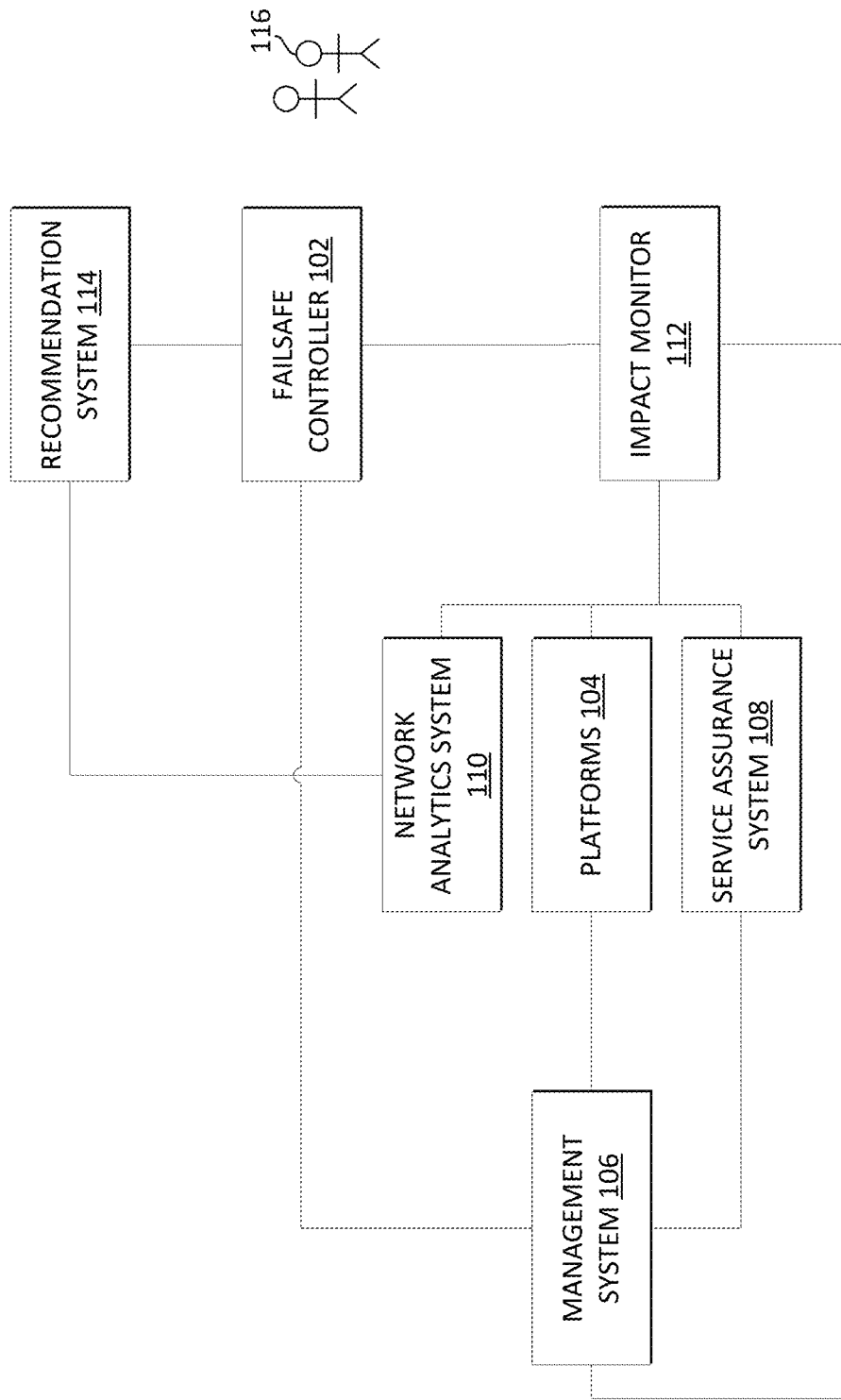
FIG. 1 illustrates example components of a communication network comprising a failsafe controller.

FIG. 1 illustrates components of a communication network 100 comprising a failsafe controller 102 in accordance with certain embodiments. The communication network 100 may also comprise a plurality of platforms 104 that provide communication functionality for the network 100. The communication network 100 further comprises a management system 106, service assurance systems 108, network analytics system 110, impact monitor 112, and recommendation system 114.

Recommendation system 114 may generate automation recommendations associated with management of the network 100 for the management system 106. In various embodiments, the generation and transmission of the automation recommendations may be automated. However, automated implementation of all of the automation recommendations may pose a risk to the network 100. For example, full automation could result in a cascade failure of platforms 104, bringing down at least a portion of the communication network 100.

In various embodiments of the present disclosure, a failsafe controller 102 may intercept the automation recommendations issued by recommendation system 114 and determine one or more actions to take responsive to the recommendations. In a sense, the failsafe controller 102 may function as a policy based automation loop "switch" or "gate" between one or more recommendation systems 114 and management systems 106. Thus, the failsafe controller 102 may effectively implement guard rails permitting safe automation operations specified by the automation recommendations to proceed and blocking or throttling potentially unsafe operations that could cause a cascade fault if the implementation of the recommendations was fully automated. In some embodiments, the failsafe controller 102 may make decisions with respect to the recommendations that would otherwise be performed by a human operator, thus reducing the amount of intervention required to keep the network operational. For example, when operating as a closed switch with respect to an automation recommendation, the failsafe controller 102 may allow implementation of the automation recommendation without requiring human intervention. In the event of an automation recommendation causing a failure or imposing a high risk of failure, the failsafe controller 102 can automatically change operation for that type of recommendation to an open loop in which further recommendations of the same type are prevented from being implemented until approved by human intervention (the failsafe controller 102 may also hold recommendations or roll-back actions taken based on a recommendation to mitigate such failures).

The communication network 100 may be any suitable network, such as a datacenter, a communications service provider infrastructure (e.g., one or more portions of an Evolved Packet Core, a radio access network, etc.), an infrastructure of a cloud service provider (e.g., Google Cloud Platform™, Microsoft® Azure® platform, etc.), an edge platform, a corporate network, a base station, a cellular tower, a micro-datacenter, a content delivery network, or other suitable computing infrastructure comprising a group of networked compute platforms.

The recommendation system 114 may generate any suitable automation recommendation. Various examples of recommendation types may include recommendations pertaining to software defined networking (SDN) control, remediation of network issues, fault prediction, preventative maintenance, changing power usage of one or more network components, anomaly detection and remediation, service level agreement (SLA) violation detection and remediation, root cause analysis, automatic optimization for platform resources (e.g., central processing unit (CPU) utilization, improved performance density, virtual machine (VM) or container placement), network reconfiguration (e.g., changing routes between base stations and a core network, changing priority of connections within the network, switching designations of an active and standby component, reconfiguration via NETCONF), starting or stopping scaling (e.g., of containers or VMs), changing a software image version of a network component, changing an operating system version of a network component, adding or removing a component of the network (e.g., a base station), telemetry aware scheduling, telemetry aware network reconfiguration, or other suitable recommendation for the communication network 100.

The automation recommendations may be generated for any suitable automation domain controlled by the management system 106. Various examples of such automation domains include management and orchestration (MANO) layers, SDN controllers, virtual infrastructure managers (e.g., OpenStack, Kubernetes), virtual network functions managers (VNFM), network function virtualization (NFV) orchestrators (NFVO), platform controller agents (such as power governors), Ansible® configuration scripts, network management systems, root cause analysis and remediation systems, base stations (or management systems controlling the base stations), or other suitable domain.

In various embodiments, the recommendation system 114 may comprise an artificial intelligence (e.g., machine learning) system to generate the recommendations and fine tune the recommendations over time (e.g., based on which automation recommendations are forwarded by the failsafe controller 102 to the management system 106 and/or based on observed conditions of the network 100), although any suitable system operable to generated automation recommendations is contemplated herein.

Failsafe controller 102 is configured with a set of "guard rails" to protect against cascade failures that could be caused by the automated recommendations from the recommendation system 114. For example, the failsafe controller 102 may be configured with impact/risk parameters and failsafe behaviors for the various types of automated recommendations that may be received from the recommendation system 114. In some embodiments, the failsafe controller 102 is configured with the impact/risk parameters and failsafe behaviors for all possible automation recommendation types (for example, a type of automation recommendation may be mapped to one or more impact/risk parameters and one or more failsafe behaviors). In various embodiments, an automation recommendation type may be mapped to multiple failsafe behaviors and the one or more failsafe behaviors that are chosen responsive to the recommendation may be determined based on the values of the observed impact/risk parameters). Various examples of such mapping are described below.

The impact/risk parameters evaluated for an automated recommendation may include any suitable parameters that describe the impact or risk of implementing the recommendation. Example impact/risk parameters include a blast radius, fault cost, an impact cost calculation, SLA service information, platform infrastructure telemetry, platform software telemetry, an evaluation window, and a ramp up window.

The blast radius may, e.g., specify a maximum allowable blast radius (number of entities that may or will be impacted). An entity counted towards a blast radius may include any suitable entity associated with the network, such as a platform 104 (e.g., a server, network switch, network gateway, or base station) or other network component or software entity, a grouping of network components (e.g., a datacenter), a subscriber, a subnetwork of the network 100, or other suitable entity.

A fault cost may specify, e.g., a cost of an automation fault (e.g., a fault occurring as a result of implementation of an automation recommendation). In some embodiments, the fault cost could be a fault cost per impacted network entity of an automation fault (some embodiments may include different fault costs for different types of network entities). The fault cost may be expressed using any suitable cost metric, such as a dollar cost (e.g., amount to fix the fault or revenue lost due to downtime), a time cost (e.g., of human hours required to remedy the fault, hours of downtime, hours of outage of service to one or more subscribers, service or information delivery delays), a distance cost (e.g., if certain network entities are affected, communications may have to travel a further distance), or other suitable cost metric.

An impact cost calculation may specify a formula for determining the aggregate cost for a particular automation recommendation. In various embodiments, the impact cost calculation may utilize one or more fault costs per impacted network entity (e.g., as described above).

The SLA service information may specify information associated with one or more SLAs to monitor.

Platform infrastructure telemetry may specify telemetry of hardware components of the network to be monitored responsive to the recommendation (e.g., if the recommendation is implemented). Examples of such telemetry will be provided below. In some embodiments, the platform infrastructure telemetry may be monitored by the impact monitor 112.

Platform software telemetry may specify telemetry of software of the network to be monitored responsive to the recommendation (e.g., if the recommendation is implemented). Examples of such telemetry will be provided below. In some embodiments, the platform software telemetry may be monitored by the impact monitor 112.

The evaluation window specifies a length of a time period after the recommendation is forwarded to the management system 106 over which the impact of the recommendation will be evaluated. The evaluation of the impact of the recommendation may include, e.g., monitoring impacted entities, the platform infrastructure telemetry, platform software telemetry, and/or SLA service information. In some embodiments, this monitoring may be performed by the impact monitor 112 or other suitable entity (e.g., the failsafe controller 102 itself).

The ramp up window specifies one or more parameters for implementation of the recommendation over a period of time. For example, in order to minimize the blast radius of a recommendation, the implementation may be gradual so as to observe the effects of the recommendation before it is rolled out to all applicable network entities. In one example, the ramp up window may include a maximum frequency of a rollout specifying how many network entities may have the recommendation applied per unit of time. In other examples, the ramp up window may otherwise describe a schedule for implementing the recommendation. In some examples, the ramp up window may specify conditions for the rollout (e.g., the ramp up window may specify conditions under which the rollout should be halted or milestones tied to the number of network entities the recommendation is rolled out to over time, where the conditions or milestones may be based on the observed telemetry). In various embodiments, when a failsafe controller 102 forwards an automation recommendation to the management system 106, the failsafe controller 102 may also send to the management system 106 information derived from the ramp up window defining how the automation recommendation is to be implemented.

In various embodiments, once a failsafe controller 102 has been programmed with one or more of these parameters, the failsafe controller 102 may communicate with the impact monitor 112 to configure the impact monitor appropriately. For example, the failsafe controller 102 may instruct the impact monitor 112 as to which telemetry or SLA information to monitor (or may communicate any other suitable impact/risk parameter to the impact monitor 112) for various automation recommendation types. In other embodiments, the impact monitor 112 could be configured directly with respect to such parameters. In various embodiments, such parameters may be communicated to the impact monitor 112 responsive to an automation recommendation received by the failsafe controller 102. For example, when a particular type of automation recommendation is received by the failsafe controller 102, the failsafe controller 102 may send information associated with the automation recommendation (e.g., an identifier, a type, etc.) and impact/risk parameters associated with the automation recommendation (e.g., any one or more of the parameters described above).

In some embodiments, the failsafe controller 102 may be implemented using one or more computing systems that are separate from one or more computing systems used to implement the impact monitor. In other embodiments, the failsafe controller 102 and the impact monitor 112 may be implemented by the same one or more computing systems.

Any suitable failsafe behaviors may be mapped to and/or taken in response to an automation recommendation by the failsafe controller 102. As various examples, the failsafe controller 102 may: notify a human operator (e.g., 116) of the automation recommendation (e.g., to request approval for the automation recommendation, to notify the human operator of a failsafe action taken responsive to the automation recommendation or to inform the human operator regarding impact/risk parameters associated with the automation recommendation), notify the recommendation system 114 of a failsafe action taken responsive to the automation recommendation (e.g., whether the automation recommendation was held, blocked, or forwarded to the management system 106 for implementation), inform the recommendation system 114 to stop sending automation recommendations of a particular type, forward an automation recommendation to the management system 106 for implementation (e.g., without seeking human operator approval or after human operator approval is received), block the automation recommendation (e.g., such that future automation recommendations of the same type may be disregarded), hold the automation recommendation (e.g., not forwarded to the management system 106) until a condition is met (e.g., the automation recommendation is approved by a human operator 116), initiate application of a remediation procedure to roll back changes made responsive to an automation recommendation (e.g., by notifying a remediation system), initiate a ramp down procedure to reduce the blast radius by decreasing the number of entities the automation recommendation is allowed be applied to (e.g., for one or more particular time periods) thus reducing the rate of the rollout, inform one or more other similar failsafe controllers in a distributed system about the automation recommendation or an action to take responsive to the automation recommendation, or other suitable action with respect to the automation recommendation.

In various embodiments, the failsafe controller 102 may perform any one or more of these failsafe actions responsive to an automation recommendation. One or more failsafe actions may be performed responsive to reception of the automation recommendation from the recommendation system 114 and/or responsive to input about the impact or risk of the recommendation as reported by the impact monitor 112 after the automation recommendation has been forwarded to the management system 106 for implementation (where the management system 106 may implement an automation recommendation, e.g., by performing one or more management actions with respect to one or more platforms 104). As one example, the failsafe controller 102 may block or hold an automation recommendation and inform a human operator 116 of the automation recommendation and/or the blocking or holding of the automation recommendation (e.g., to allow the human operator to approve the forwarding of the automation recommendation to the management system 106). As another example, the failsafe controller 102 may forward an automation recommendation to the management system 106 and inform a human operator 116 and/or the recommendation system 114 that the automation recommendation has been forwarded. As another example, the failsafe controller 102 may block an automation recommendation and inform the recommendation system 114 that the automation recommendation was blocked. As yet another example, the failsafe controller 102 may forward an automation recommendation to the management system 106 and then later initiate a ramp down or application of a remediation procedure (e.g., responsive to telemetry data indicating potential issues). Any other suitable combination of the failsafe behaviors may be performed (generally simultaneously or at different times) responsive to an automation recommendation.

The failsafe controller 102 may also be configured with any other suitable parameters relating to the automation recommendations that may be received. For example, the failsafe controller 102 may be configured with a value specifying the maximum frequency of automation recommendations that may be forwarded to the management system 106. This maximum frequency may apply to automation recommendations in the aggregate or could apply to a particular type of automation recommendations (e.g., software upgrades) (and in some embodiments, multiple different maximum frequencies may be configured for various types of automation recommendations). Such maximum frequency parameters may protect the management system 106 from being overloaded by the recommendation system 114.

As another example, the failsafe controller 102 may be configured with one or more identifiers of a target management system (e.g., management system 106) so that the failsafe controller 102 may forward automation recommendations to the appropriate management system. In some embodiments, a single failsafe controller 102 may forward automation recommendations to multiple management systems 106 (directly or through an intermediary) and the failsafe controller 102 may be configured appropriately (e.g., automation recommendations received by a failsafe controller 102 from a particular recommendation system 114 may be sent to a particular management system 106, while automation recommendations received by the failsafe controller 102 from a different recommendation system 114 may be sent to a different management system 106).

Similarly, the failsafe controller 102 may be configured with one or more identifiers of a computing system associated with a human operator 116 in order to allow the failsafe controller 102 to provide information to and receive information from the human operator.

During operation, the recommendation system 114 generates an automation recommendation and provides the automation recommendation to the failsafe controller 102. The failsafe controller 102 may determine whether the automation recommendation is to be forwarded to the management system 106.

If an automation recommendation of the same type has previously been processed and is marked as hold or block, then the automation recommendation may be held (e.g., if a previous automation recommendation of the same type is held) or blocked (e.g., if a previous automation recommendation of that type has been blocked). Further requests for this specific automation recommendation type are not forwarded by the failsafe controller 102, absent some type of interaction (e.g., the human operator 116 updates the policy configuration or clears the hold for the automation recommendation).

The automation recommendation may similarly be held or blocked (depending on the configuration) if the forwarding of the automation recommendation would exceed a maximum recommendation frequency parameter. In some embodiments, once time has passed such that the maximum recommendation frequency parameter is no longer exceeded (or if a human operator 116 has explicitly approved the automation recommendation), the automation recommendation may be forwarded to the management system 106. In various embodiments, the failsafe controller 102 operates independently from the recommendation system 114 such that the recommendation system 114 does not know which automation recommendations have been implemented absent explicit communication of such from the failsafe controller 102 and thus may send the same automation recommendation multiple times.

If the automation recommendation is allowed (e.g., not marked as hold or block and doesn't exceed the maximum recommendation frequency parameter), the failsafe controller 102 forwards the automation recommendation to the target management system (e.g., 106) or otherwise initiates the implementation of the automation recommendation. Responsive to determining the automation recommendation is allowed, the failsafe controller 102 may also send to the impact monitor 112 information about the automation recommendation (e.g., an identifier of the automation recommendation, the recommendation type, etc.) and/or relevant impact/risk parameters to be monitored in association with the automation recommendation. In some embodiments, the impact monitor 112 may look up one or more impact/risk parameters to monitor based on information about the automation recommendation received from the failsafe controller 102 (e.g., when the impact monitor is configured with such information ahead of time).

In various embodiments, actions taken by the failsafe controller 102 responsive to an automation recommendation are based on policy rules and an impact/risk score for an automation recommendation. In some embodiments, the impact/risk score is generated by the impact monitor 112 based on monitored impact/risk parameters. In one example, a policy rule may define ranges of scores (or single scores) that correspond to sets of one or more failsafe actions. For example, one range of scores (or a particular score) may correspond to a high risk automation recommendation and may map to a failsafe action of putting the type of the automation recommendation on hold (such that future automation recommendations of that type are not forwarded until a human operator 116 intervenes) and informing a human operator 116 about the automation recommendation to allow the human operator 116 to review and approve the automation recommendation if that type of automation recommendation is still deemed desirable in spite of the impact of the automation recommendation. As another example, another range of scores (or a particular score) may correspond to a medium risk automation recommendation in which the corresponding failsafe actions are to mark the type of automation recommendation to be forwarded to the management system 106 (such that future automation recommendations of that type are forwarded without human intervention) but also to ramp down the current automation recommendation. As yet another example, another range of scores (or a particular score) may correspond to a very high risk automation recommendation in which the corresponding failsafe actions are to mark the type of automation recommendation to be held as well as to initiate a remediation procedure for the current automation recommendation. Any other suitable mappings of impact/risk scores to one or more failsafe actions are contemplated herein.

Impact monitor 112 is operable to monitor impact/risk parameters for an automation recommendation that has been forwarded to the management system 106. In one example, impact monitor 112 comprises a probe on a computing platform in the network 100. In some examples, the impact monitor may be integrated with a management system 106 (e.g., a VNFM). In various examples, at least a portion of the impact monitor 112 may be local to or remote from one or more platforms (e.g., 104) that the impact monitor 112 is monitoring. In one example, a single impact monitor 112 may monitor a plurality of platforms 104 of the network 100. In one example, the impact monitor 112 is implemented by a computing platform that implements a Network Data Analytics Function (NWDAF) (e.g., as defined by any suitable 3GPP standard) to collect analytics data from user equipment, network functions, and operations, administration, and maintenance (OAM) systems, or other network entities, e.g., from one or more core, cloud, or edge networks.

The impact monitor 112 may utilize inputs from telemetry data of platforms that it is monitoring to determine risk/impact scores for any number of automation recommendations. In some examples, the impact monitor 112 may also utilize inputs from service assurance systems including virtual passive and active probes, where virtual passive probes may function as passive observers in a system to determine the effect (e.g., dropped packets, non-responsiveness of network elements, etc.) of an automation recommendation while an active probe may inject traffic (or perform some other network action) and observe characteristics associated with the action (e.g., check the throughput and latency of the traffic). The impact monitor 112 may check the telemetry (e.g., from the platforms 104) or probe data or other SLA information (e.g., from service assurance system 108) to determine whether monitored platforms or services are outside of the associated SLA during the evaluation window. In various embodiments, the number of entities that are outside of the SLA and/or the extent to which one or more entities are outside of the SLA may be used as an input for determining the risk/impact scores.

The impact monitor 112 may perform one or more comparisons against impact/risk parameters for an automation recommendation that has been initiated (e.g., forwarded to a management system 106) in order to determine an impact/risk score of the automation recommendation within the evaluation window. For example, the impact monitor 112 may compare the number of platforms, services, and/or other network entities negatively impacted by the automation recommendation against the maximum allowable blast radius within the evaluation window. The negative impact may be determined in any suitable manner, such as whether the entity is noncompliant with one or more SLAs that apply to the entity. As another example, a negative impact may be based on a change in any suitable telemetry metric or combination of telemetry metrics associated with the entity. In some embodiments, multiple comparisons may be made (e.g., a comparison for platforms, a comparison for services, a comparison for subscribers, etc.) and the impact/risk score may be based on any one or more of these comparisons. As another example, the impact monitor 112 may compare a cost of one or more faulty network entities (e.g., platform, service, etc.) against the maximum allowable outage cost within the evaluation window.

Based on one or more of these comparisons or other observed telemetry metrics, the impact monitor may assign an impact/risk score to the automation recommendation, wherein the impact/risk score provides an indication of the impact to the network 100 and/or the risk to the network 100 of the automation recommendation. In one example, the impact/risk score may be a score between 1 and 100, but any suitable scoring methodology may be used. The impact/risk score is then provided to the failsafe controller 102.

The failsafe controller 102 may take any suitable action based on the impact/risk score and policy rules defining actions to take based on the scores. In one example, the failsafe controller 102 may update a risk rating of the automation recommendation responsive to receiving the impact/risk score. If the score is below a configured threshold, a hold notification is sent to the human operator 116 along with identifying information about the automation recommendation (e.g., the type of the automation recommendation, results of the automation recommendation, etc.).

Further requests for that type of automation recommendation are not forwarded to the management system 106 until the human operator 116 updates the policy configuration for the recommendation or clears the hold.

Other actions taken responsive to the impact/risk score may; include any of the failsafe actions described above. For example, responsive to the impact/risk score, the failsafe controller 102 may inform the recommendation system of a hold, instruct a remediation system to remediate the automation recommendation, initiate a ramp down of the automation recommendation by reducing the number of entities the automation recommendation is applied to for a certain time period, or inform other failsafe controllers of the impact/risk score or other information associated with the automation recommendation (e.g., which actions were taken).

Platforms 104 may comprise any suitable computing platforms that provide functionality of the network 100. For example, a platform 104 may comprise a server (e.g., implementing one or more of a hub, switch, router, bridge, gateway, etc.), a base station, user equipment, or other computing entity. A platform may comprise any suitable processing circuitry (e.g., one or more processor units, one or more memories, one or more network interfaces, etc.).

The impact monitor 112 may utilize any suitable telemetry in evaluating the impact/risk of the automation recommendations. For example, the impact monitor 112 may utilize platform infrastructure telemetry or platform software telemetry from any of the platforms 104, such as packet drops, CPU utilization, thermal measurements, power usage, cache (e.g., last level cache) and memory bandwidth utilization (e.g., from Intel® Resource Director Technology (RDT) or similar technology), integrated load balancer metrics (e.g., from Intel® Dynamic Load Balancer (DLB) or similar technology), storage metrics (e.g., Self-Monitoring, Analysis and Reporting Technology (SMART) metrics such as indications of drive reliability) including but not limited to metrics for persistent memory, accelerator metrics (e.g., from Intel® QuickAssist Technology (QAT) or similar technology), Data Plane Development Kit (DPDK) metrics, Open Data Plane (ODP) metrics, Storage Performance Development Kit (SPDK) metrics, Linux syslog, hardware (e.g., CPU and memory) fault information (e.g., from Intel® Reliability, Availability, and Serviceability (RAS) or similar technology), field programmable gate array (FPGA) metrics, graphics processing unit (GPU) metrics, operating system logs or faults, resets performed, unrecoverable faults, virtualization metrics, container metrics (e.g., status, CPU, memory, storage, network metrics), Kubernetes metrics (e.g., kube-state-metrics), OpenStack metrics, process metrics (e.g., state, CPU, memory, storage, networking metrics), virtual switch metrics, or other suitable platform infrastructure telemetry or platform software telemetry.

Additionally or alternatively, the impact monitor 112 may utilize network telemetry from network analytics systems (e.g., through IPFIX/NETCONF/sflow telemetry) such as network analytics system 110, upstream and downstream telemetry from network probes (active or passive probes), network analytics functions such as NWDAF/Management Data Analytics Service (MDAS) systems, telemetry from an 0-RAN Near Realtime RAN Intelligent Controller (RIC), fault reports from customer support systems, impact reports from other impact monitors 112 (e.g., since the automation recommendation may be rolled out in a distributed manner in some embodiments), 3GPP Key Performance Indicators (KPIs) (e.g., indicators obtained directly from RAN and core elements), element management system performance and fault telemetry, VNFM performance and fault telemetry, Simple Network Management Protocol (SNMP) Traps/Alarms, NETCONF alarms from routers and switches, telemetry data obtained directly from workloads (e.g., through open telemetry metrics, logs, or traces), or other suitable telemetry.

In some embodiments, one or more management systems 106 may provide telemetry data generated or collected by any of its components directly to the impact monitor 112 for use in impact assessment. Additionally or alternatively, one or more management systems 106 may send telemetry data to one or more service assurance systems 108, and a service assurance system 108 may aggregate or process the telemetry data and then feed the aggregated or processed telemetry data to impact monitor 112.

Service assurance system 108 may include one or more service assurance probes (such as any of the probes described above) and circuitry to configure and otherwise manage such probes. In some examples, the service assurance systems 108 may be deployed by an operator (e.g., a mobile carrier) to ensure that various platforms 104 are operating correctly. Sometimes the service assurance systems 108 may provide an independent check (e.g., independent of any checks performed by the management system 106) on the operability of the components of the network. The service assurance system 108 may also provide service SLA information to the impact monitor (e.g., indications of entities that are not in compliance with one or more SLAs). In various embodiments, a service assurance system 108 may generate automation recommendations that are processed by the failsafe controller 102 (e.g., using any of the failsafe operations described herein).

Network analytics system 110 may generate any suitable network analytics information based on any suitable telemetry data described herein (or may collect telemetry data from various platforms and pass the collected telemetry data or aggregated telemetry data). Network analytics system 110 may provide any of its collected or generated information to the service assurance system 108, impact monitor 112, and/or recommendation system 114.

Although the embodiment depicted includes a single failsafe controller 102, management system 106, service assurance system 108, impact monitor 112, and recommendation system 114, other embodiments may include any number of any of these entities. For example, various ones of these entities may be distributed throughout network 100. In one example, multiples of a particular type of entity (e.g., failsafe controllers 102, impact monitors 112, etc.) may be arranged in a hierarchical fashion. As one example, in a cellular network, one failsafe controller 102 may process automation recommendations for base stations while another failsafe controller 102 may process automation recommendations for the core network. Thus, in some examples, each failsafe controller 102 may have a specific domain. As another example, failsafe controllers 102 may each be assigned a geographical area in a cellular network.

In various embodiments, failsafe controller 102 may implement a machine learning system which learns allowable automation recommendations over time based on the inputs of the human operators 116 and/or the telemetry monitored during the evaluation windows of the automation recommendations.

Figure 2:
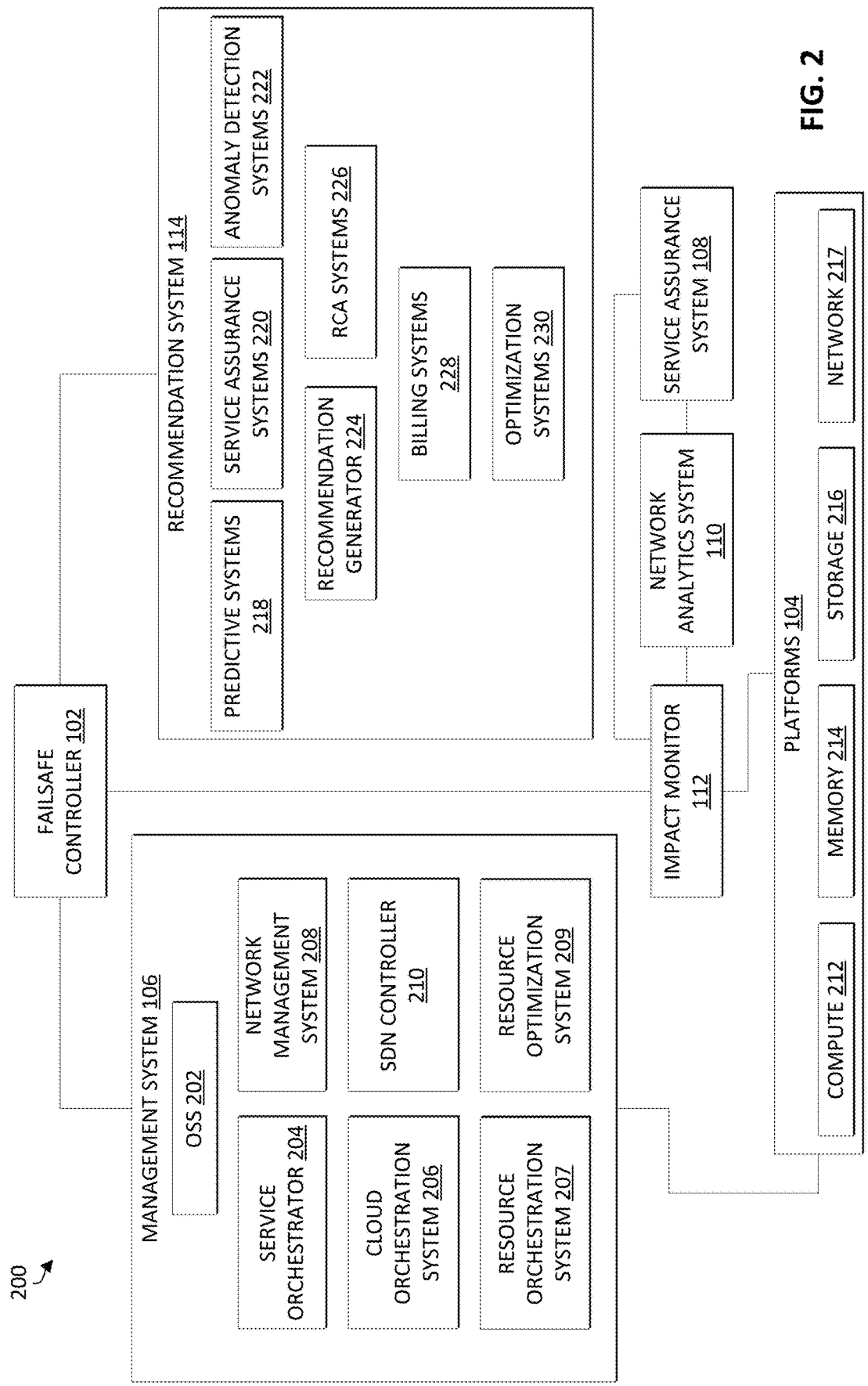
FIG. 2 illustrates example components of the communication network of FIG. 1 in further detail.

FIG. 2 illustrates components of a communication network 200 comprising a failsafe controller 102 in accordance with certain embodiments. Communication network includes failsafe controller 102, platforms 104, management system 106, service assurance system 108, network analytics system 110, impact monitor 112, and recommendation system 114. FIG. 2 depicts an example arrangement and example components of various components depicted in FIG. 1.

In the embodiment depicted, management system 106 is communicatively coupled to platforms 104 and includes various components to provide the functionality of the management system 106. For example, in the embodiment depicted, the management system comprises an operations support system (OSS) 202, a service orchestrator 204, a cloud orchestration system 206, a resource orchestration system 207 (e.g., which may encompass a virtualized infrastructure manager (VIM) layer of a MANO stack), a network management system 208, a resource optimization system 209 (e.g., which may encompass an automatic platform resource optimization system that can rely on the automation recommendations), and an SDN controller 210.

Platforms 104 may include any suitable components to perform the operations of the platforms 104 and to generate telemetry data for use by the impact monitor 112, such as compute elements 212 (e.g., processor units), memory elements 214, storage elements 216, and network elements 217 (e.g., network interfaces).

Recommendation system 114 may include any suitable components to generate automation recommendations for the network 200. In the embodiment depicted, recommendation system 114 includes predictive systems 218, service assurance systems 220, anomaly detection systems 222, recommendation generator 224, root cause analysis (RCA) systems 226, billing systems 228, and optimization systems 230.

Figure 3:
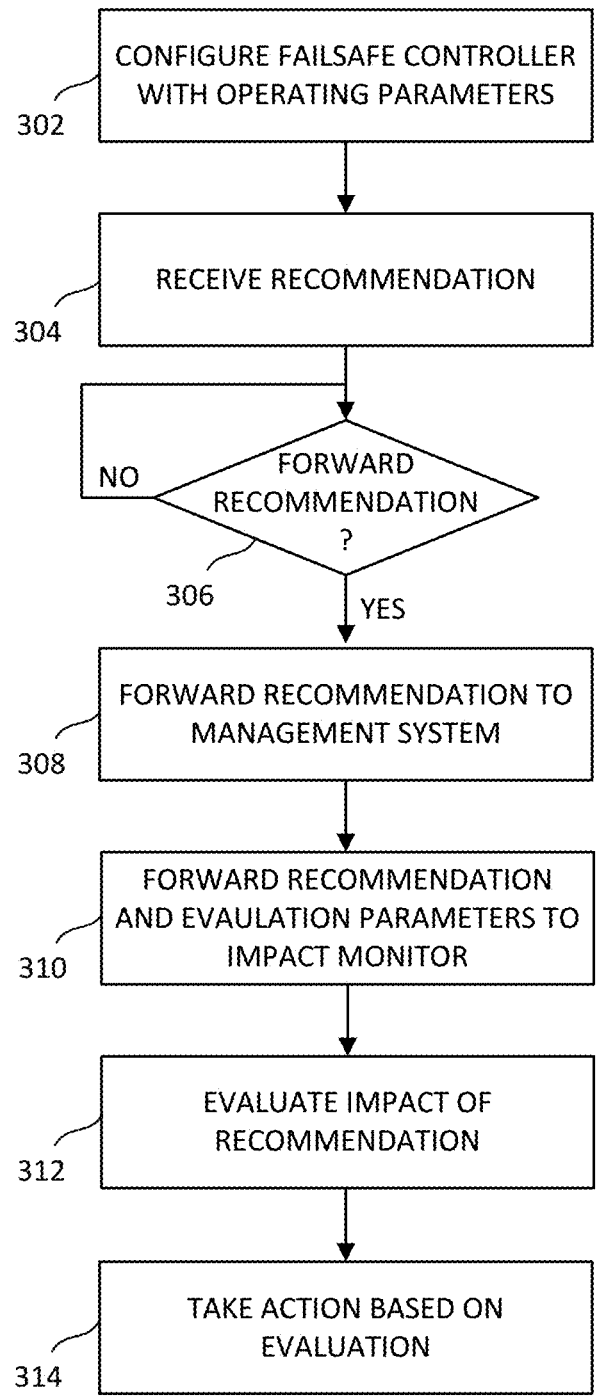
FIG. 3 illustrates an example flow for failure prevention in a communication network.

FIG. 3 illustrates a flow 300 for implementing failsafe operations in accordance with certain embodiments. At 302, the failsafe controller 102 is configured with operating parameters (e.g., any of the parameters described above, such as impact/risk parameters, maximum frequency of automation recommendations, target management system identifiers, etc.).

At 304, an automation recommendation is received at the failsafe controller 102. At 306, the failsafe controller 102 determines whether to the forward the automation recommendation to a target management system 106. For example, if a maximum frequency of automation recommendations is exceeded, then the automation recommendation is not forwarded. The failsafe controller 102 may discard the recommendation or may wait for a period of time and then determine again whether it should forward the recommendation. As another example, if an automation recommendation is of the same type as an automation recommendation that has previously been marked as hold or block, then the automation recommendation is held or blocked and is not forwarded to the target management system 106 (e.g., unless a human operator approves the automation recommendation).

At 308, upon determining that it is appropriate to do so, the failsafe controller 102 forwards the automation recommendation to the target management system 106. At 310, the fail safe controller 102 forwards identifying information about the automation recommendation and one or more evaluation parameters to the impact monitor 112. At 312, the impact monitor evaluates (e.g., by observing the evaluation parameters over an evaluation window) the impact of the automation recommendation. The impact monitor 112 may also provide information about the evaluation (e.g., an impact/risk score) to the failsafe controller 102.

At 314, the failsafe controller 102 takes an action based on the evaluation. For example, the failsafe controller 102 may be configured with policies that direct one or more failsafe actions to take responsive to the evaluation information. For example, the failsafe controller 102 may decide to ramp up the automation recommendation, roll back the automation recommendation, block or hold future recommendations of that type, or allow the automation recommendation to continue proceeding.

Some of the actions illustrated in FIG. 3 may be repeated, combined, modified or deleted where appropriate, and additional actions may also be added to the flowchart. Additionally, actions may be performed in any suitable order without departing from the scope of particular embodiments.

The following FIGS. depict systems and components that may be used in conjunction with the embodiments described above. For example, the systems or components depicted in the following FIGS. or components thereof may be used to implement any one or more component of network 100. As just a few examples, failsafe controller 102, impact monitor 112, or a platform 104 may comprise any one or more of the components of processor 400, computing system 500, data center 600, rack architecture 700, computing environment 800, or network interface 900.

Figure 4:
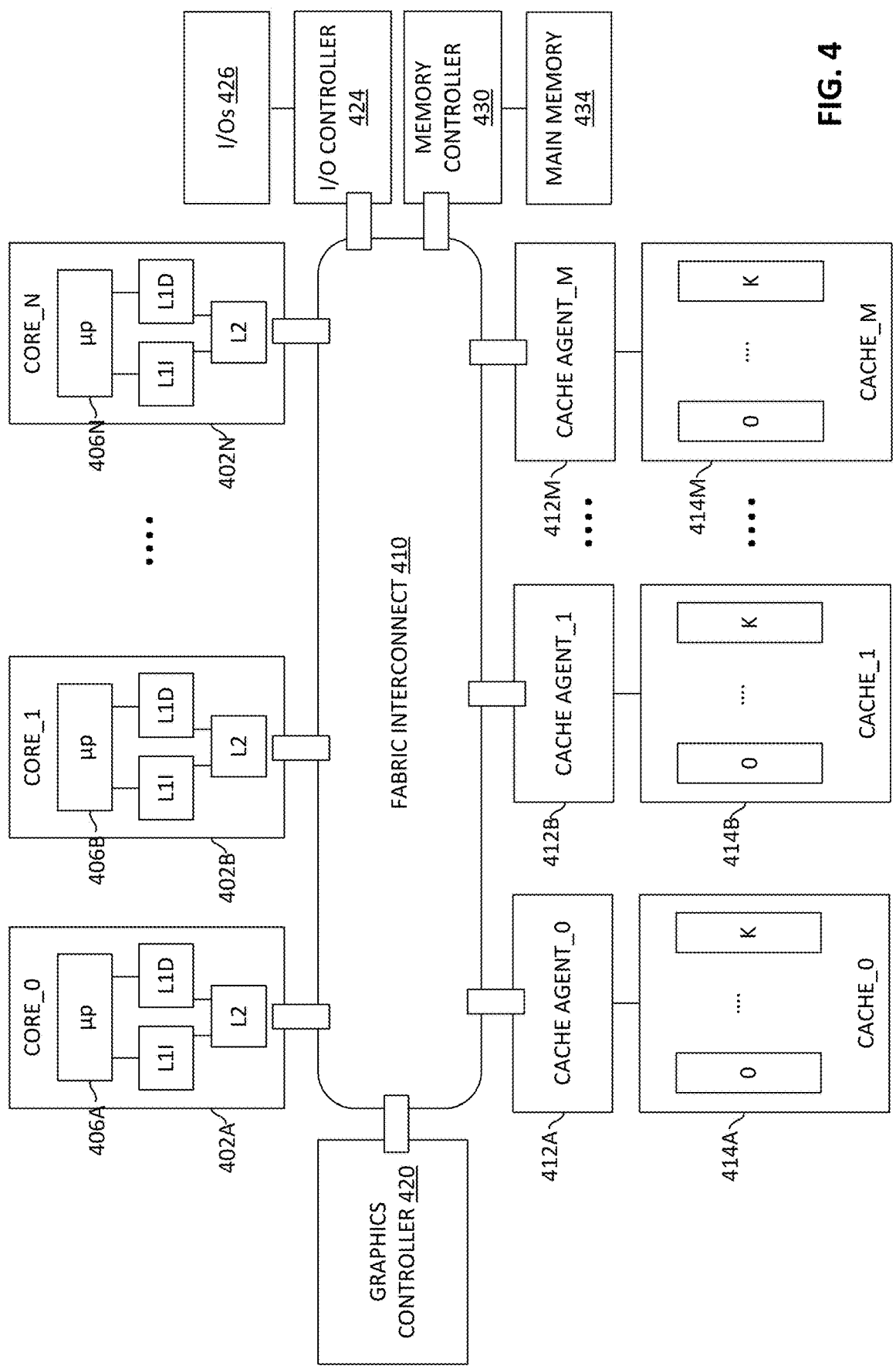
FIG. 4 illustrates a block diagram of an example processor with a plurality of cache agents and caches.

FIG. 4 illustrates a block diagram of a processor 400 with a plurality of cache agents 412 and caches 414 in accordance with certain embodiments. In a particular embodiment, processor 400 may be a single integrated circuit, though it is not limited thereto. The processor 400 may be part of a system on a chip in various embodiments. The processor 400 may include, for example, one or more cores 402A, 402B . . . 402N. In a particular embodiment, the cores may include a corresponding microprocessor 406A, 406B, or 406N, level one instruction (L1I) cache, level one data cache (L1D), and level two (L2) cache. The processor 400 may further include one or more cache agents 412A, 412B . . . 412M (any of these cache agents may be referred to herein as cache agent 412), and corresponding caches 414A, 414B . . . 414M (any of these caches may be referred to as cache 414). In a particular embodiment, a cache 414 is a last level cache (LLC) slice. An LLC may be made up of any suitable number of LLC slices. Each cache may include one or more banks of memory that corresponds (e.g., duplicates) data stored in system memory 434. The processor 400 may further include a fabric interconnect 410 comprising a communications bus (e.g., a ring or mesh network) through which the various components of the processor 400 connect. In one embodiment, the processor 400 further includes a graphics controller 420, an I/O controller 424, and a memory controller 430. The I/O controller 424 may couple various I/O devices 426 to components of the processor through the fabric interconnect 410. Memory controller 430 manages memory transactions to and from system memory 434.

The processor 400 may be any type of processor, including a general purpose microprocessor, special purpose processor, microcontroller, coprocessor, graphics processor, accelerator, field programmable gate array (FPGA), or other type of processor (e.g., any processor described herein). The processor 400 may include multiple threads and multiple execution cores, in any combination. In one embodiment, the processor 400 is integrated in a single integrated circuit die having multiple hardware functional units (hereafter referred to as a multi-core system). The multi-core system may be a multi-core processor package, but may include other types of functional units in addition to processor cores. Functional hardware units may include processor cores, digital signal processors (DSP), image signal processors (ISP), graphics cores (also referred to as graphics units), voltage regulator (VR) phases, input/output (I/O) interfaces (e.g., serial links, DDR memory channels) and associated controllers, network controllers, fabric controllers, or any combination thereof.

System memory 434 stores instructions and/or data that are to be interpreted, executed, and/or otherwise used by the cores 402A, 402B . . . 402N. The cores may be coupled towards the system memory 434 via the fabric interconnect 410. In some embodiments, the system memory 434 has a dual-inline memory module (DIMM) form factor or other suitable form factor.

The system memory 434 may include any type of volatile and/or non-volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), a memristor, phase change memory, Spin Hall Effect Magnetic RAM (SHE-MRAM), Spin Transfer Torque Magnetic RAM (STTRAM), or other non-volatile memory devices.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory array is synchronous dynamic random access memory (SDRAM). In some embodiments, any portion of system memory 434 that is volatile memory can comply with JEDEC standards including but not limited to Double Data Rate (DDR) standards, e.g., DDR3, 4, and 5, or Low Power DDR4 (LPDDR4) as well as emerging standards.

A cache (e.g., 414) may include any type of volatile or non-volatile memory, including any of those listed above. Processor 400 is shown as having a multi-level cache architecture. In one embodiment, the cache architecture includes an on-die or on-package L1 and L2 cache and an on-die or on-chip LLC (though in other embodiments the LLC may be off-die or off-chip) which may be shared among the cores 402A, 402B, . . . 402N, where requests from the cores are routed through the fabric interconnect 410 to a particular LLC slice (e.g., a particular cache 414) based on request address. Any number of cache configurations and cache sizes are contemplated. Depending on the architecture, the cache may be a single internal cache located on an integrated circuit or may be multiple levels of internal caches on the integrated circuit. Other embodiments include a combination of both internal and external caches depending on particular embodiments.

During operation, a core 402A, 402B . . . or 402N may send a memory request (read request or write request), via the L1 caches, to the L2 cache (and/or other mid-level cache positioned before the LLC). In one case, a cache agent 412 may intercept a read request from an L1 cache. If the read request hits the L2 cache, the L2 cache returns the data in the cache line that matches a tag lookup. If the read request misses the L2 cache, then the read request is forwarded to the LLC (or the next mid-level cache and eventually to the LLC if the read request misses the mid-level cache(s)). If the read request misses in the LLC, the data is retrieved from system memory 434. In another case, the cache agent 412 may intercept a write request from an L1 cache. If the write request hits the L2 cache after a tag lookup, then the cache agent 412 may perform an in-place write of the data in the cache line. If there is a miss, the cache agent 412 may create a read request to the LLC to bring in the data to the L2 cache. If there is a miss in the LLC, the data is retrieved from system memory 434. Various embodiments contemplate any number of caches and any suitable caching implementations.

A cache agent 412 may be associated with one or more processing elements (e.g., cores 402) and may process memory requests from these processing elements. In various embodiments, a cache agent 412 may also manage coherency between all of its associated processing elements. For example, a cache agent 412 may initiate transactions into coherent memory and may retain copies of data in its own cache structure. A cache agent 412 may also provide copies of coherent memory contents to other cache agents.

In various embodiments, a cache agent 412 may receive a memory request and route the request towards an entity that facilitates performance of the request. For example, if cache agent 412 of a processor receives a memory request specifying a memory address of a memory device (e.g., system memory 434) coupled to the processor, the cache agent 412 may route the request to a memory controller 430 that manages the particular memory device (e.g., in response to a determination that the data is not cached at processor 400. As another example, if the memory request specifies a memory address of a memory device that is on a different processor (but on the same computing node), the cache agent 412 may route the request to an inter-processor communication controller which communicates with the other processors of the node. As yet another example, if the memory request specifies a memory address of a memory device that is located on a different computing node, the cache agent 412 may route the request to a fabric controller (which communicates with other computing nodes via a network fabric such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable board-to-board or chassis-to-chassis interconnect).

In particular embodiments, the cache agent 412 may include a system address decoder that maps virtual memory addresses and/or physical memory addresses to entities associated with the memory addresses. For example, for a particular memory address (or region of addresses), the system address decoder may include an indication of the entity (e.g., memory device) that stores data at the particular address or an intermediate entity on the path to the entity that stores the data (e.g., a computing node, a processor, a memory controller, an inter-processor communication controller, a fabric controller, or other entity). When a cache agent 412 processes a memory request, it may consult the system address decoder to determine where to send the memory request.

In particular embodiments, a cache agent 412 may be a combined caching agent and home agent, referred to herein in as a caching home agent (CHA). A caching agent may include a cache pipeline and/or other logic that is associated with a corresponding portion of a cache memory, such as a distributed portion (e.g., 414) of a last level cache. Each individual cache agent 412 may interact with a corresponding LLC slice (e.g., cache 414). For example, cache agent 412A interacts with cache 414A, cache agent 412B interacts with cache 414B, and so on. A home agent may include a home agent pipeline and may be configured to protect a given portion of a memory such as a system memory 434 coupled to the processor. To enable communications with such memory, CHAs may be coupled to memory controller 430.

In general, a CHA may serve (via a caching agent) as the local coherence and cache controller and also serve (via a home agent) as a global coherence and memory controller interface. In an embodiment, the CHAs may be part of a distributed design, wherein each of a plurality of distributed CHAs are each associated with one of the cores 402. Although in particular embodiments a cache agent 412 may comprise a cache controller and a home agent, in other embodiments, a cache agent 412 may comprise a cache controller but not a home agent.

I/O controller 424 may include logic for communicating data between processor 400 and I/O devices 426, which may refer to any suitable devices capable of transferring data to and/or receiving data from an electronic system, such as processor 400. For example, an I/O device may be a network fabric controller; an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device 426 may communicate with I/O controller 424 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various embodiments, I/O devices 426 coupled to the I/O controller 424 may be located off-chip (e.g., not on the same integrated circuit or die as a processor) or may be integrated on the same integrated circuit or die as a processor.

Memory controller 430 is an integrated memory controller (e.g., it is integrated on the same die or integrated circuit as one or more cores 402 of the processor 400) that includes logic to control the flow of data going to and from system memory 434. Memory controller 430 may include logic operable to read from a system memory 434, write to a system memory 434, or to request other operations from a system memory 434. In various embodiments, memory controller 430 may receive write requests originating from cores 402 or I/O controller 424 and may provide data specified in these requests to a system memory 434 for storage therein. Memory controller 430 may also read data from system memory 434 and provide the read data to I/O controller 424 or a core 402. During operation, memory controller 430 may issue commands including one or more addresses (e.g., row and/or column addresses) of the system memory 434 in order to read data from or write data to memory (or to perform other operations). In some embodiments, memory controller 430 may be implemented in a different die or integrated circuit than that of cores 402.

Although not depicted, a computing system including processor 400 may use a battery, renewable energy converter (e.g., solar power or motion-based energy), and/or power supply outlet connector and associated system to receive power, a display to output data provided by processor 400, or a network interface allowing the processor 400 to communicate over a network. In various embodiments, the battery, power supply outlet connector, display, and/or network interface may be communicatively coupled to processor 400.

Figure 5:
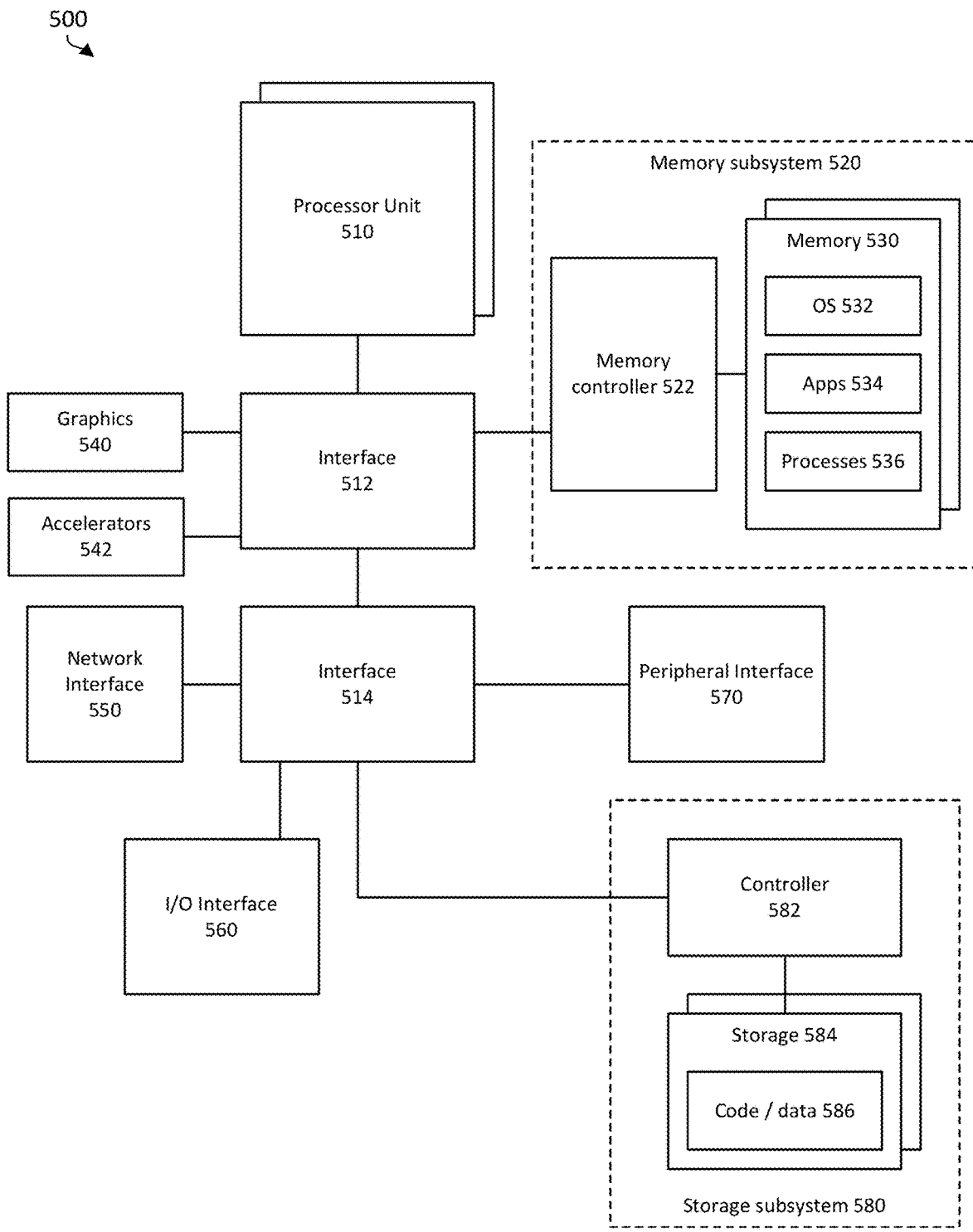
FIG. 5 illustrates an example computing system.

FIG. 5 depicts an example computing system. System 500 includes processor unit 510, which provides processing, operation management, and execution of instructions for system 500. Processor unit 510 can include any type of central processing unit (CPU), processor core, graphics processing unit, hardware accelerator, field programmable gate array, neural network processing unit, artificial intelligence processing unit, inference engine, data processing unit, or infrastructure processing unit, microprocessor, or other processing hardware to provide processing for system 500, or a combination of processor units. Processor unit 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 500 includes interface 512 coupled to processor unit 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor unit 510 or both. In one example, graphics interface 540 generates a display based on data stored in memory 530 or based on operations executed by processor unit 510 or both.

Accelerators 542 can be a fixed function offload engine that can be accessed or used by a processor unit 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processor unit 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processor unit 510 or a physical part of interface 512. For example, memory controller 522 can be an integrated memory controller, integrated onto a circuit with processor unit 510.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include stand-alone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory. Various embodiments can be used in connection with network interface 550, processor unit 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processor unit 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor unit 510 or can include circuits or logic in both processor unit 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. In various embodiments, a hybrid CTLE circuit (e.g., 100 or variations thereof) as described herein may be used to equalize a signal sent via any suitable high speed interconnect such as those described above or other suitable interconnect. Data can be copied or stored to virtualized storage nodes using a protocol such as NVMe over Fabrics (NVMe-oF) or NVMe.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 6:
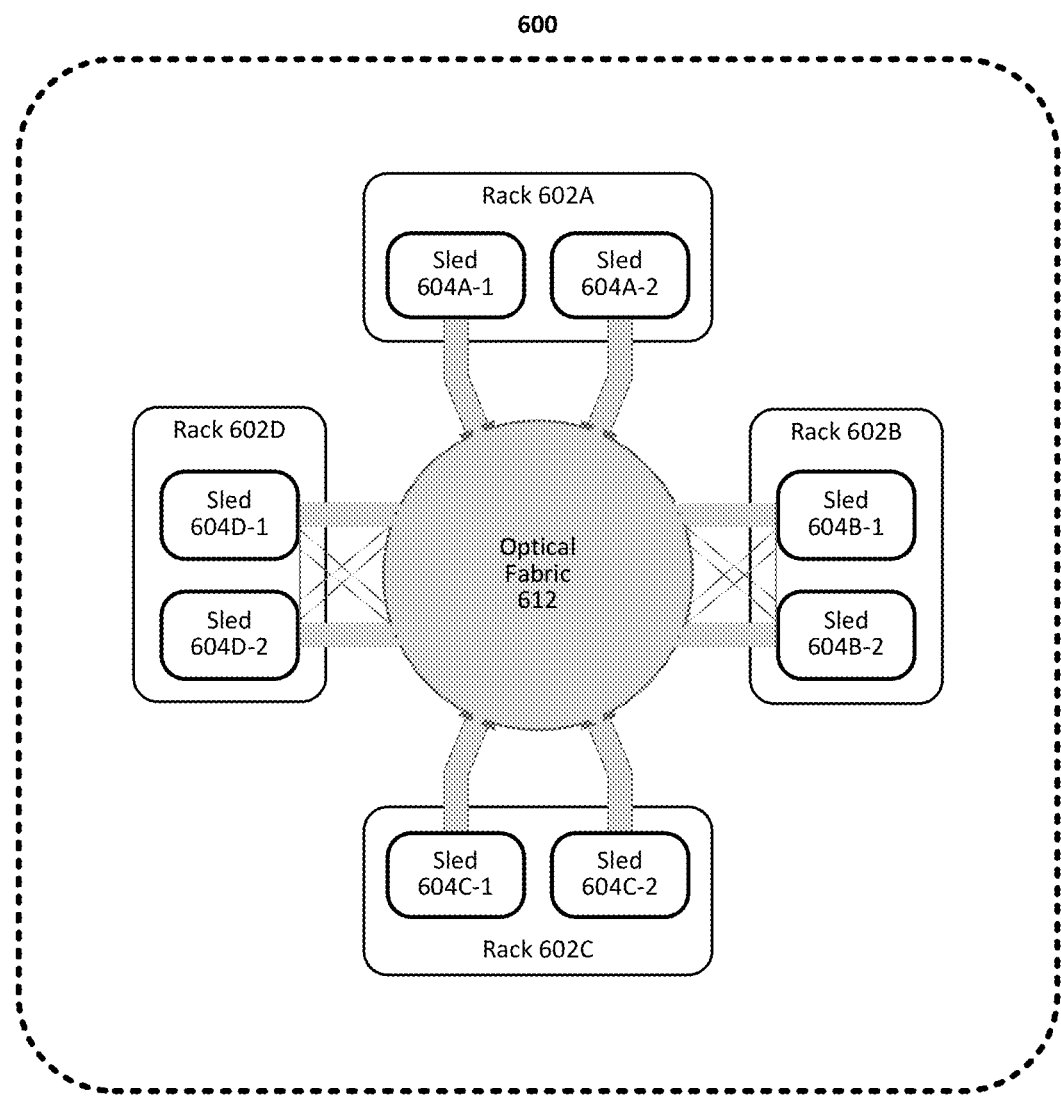
FIG. 6 illustrates an example data center.

FIG. 6 depicts an example of a data center. As shown in FIG. 6, data center 600 may include an optical fabric 612. Optical fabric 612 may generally include a combination of optical signaling media (such as optical cabling) and optical switching infrastructure via which any particular sled in data center 600 can send signals to (and receive signals from) each of the other sleds in data center 600. The signaling connectivity that optical fabric 612 provides to any given sled may include connectivity both to other sleds in a same rack and sleds in other racks. Data center 600 includes four racks 602A to 602D and racks 602A to 602D house respective pairs of sleds 604A-1 and 604A-2, 604B-1 and 604B-2, 604C-1 and 604C-2, and 604D-1 and 604D-2. Thus, in this example, data center 600 includes a total of eight sleds. Optical fabric 612 can provide each sled signaling connectivity with one or more of the seven other sleds. For example, via optical fabric 612, sled 604A-1 in rack 602A may possess signaling connectivity with sled 604A-2 in rack 602A, as well as the six other sleds 604B-1, 604B-2, 604C-1, 604C-2, 604D-1, and 604D-2 that are distributed among the other racks 602B, 602C, and 602D of data center 600. The embodiments are not limited to this example.

Figure 7:
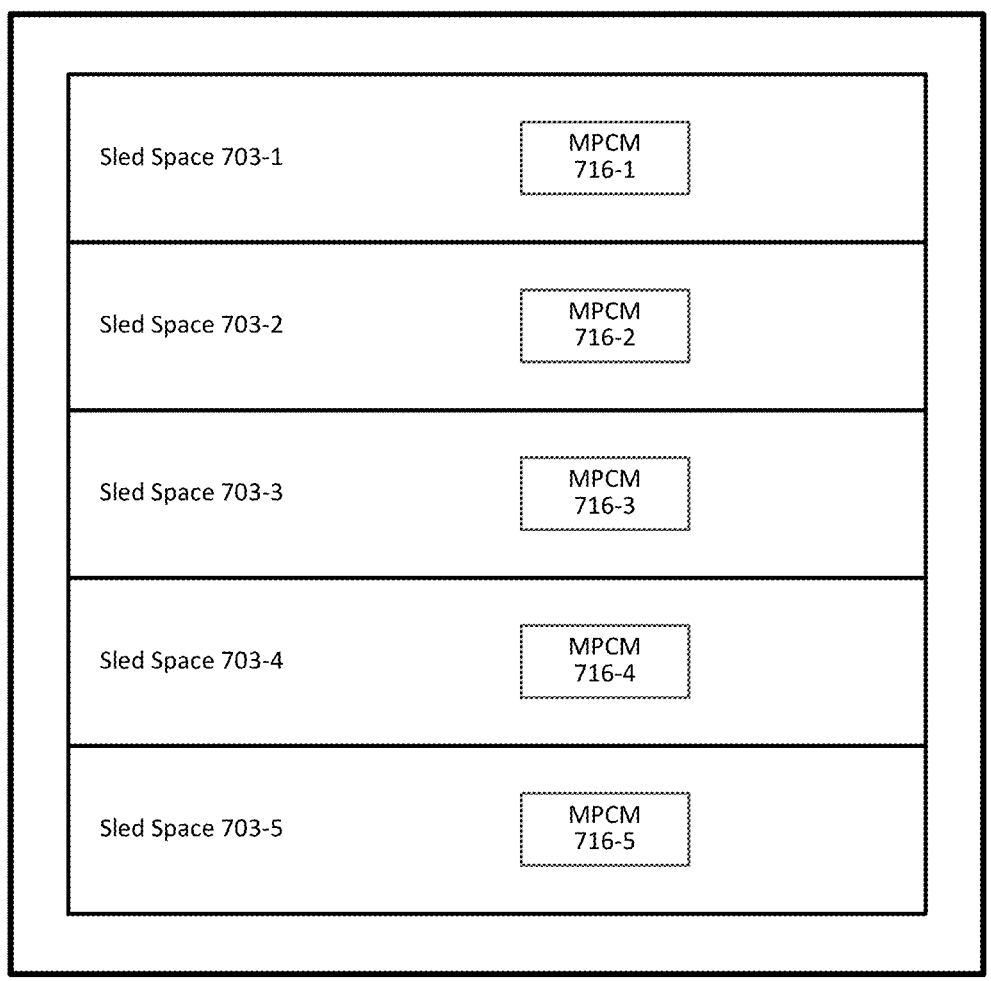
FIG. 7 illustrates an example rack architecture.

FIG. 7 depicts a rack architecture such that a plurality of sled spaces can have sleds inserted. Sled spaces can be robotically-accessible via a rack access region 701. In the particular non-limiting example, rack architecture 700 features five sled spaces 703-1 to 703-5. Sled spaces 703-1 to 703-5 feature respective multi-purpose connector modules (MPCMs) 716-1 to 716-5.

Figure 8:
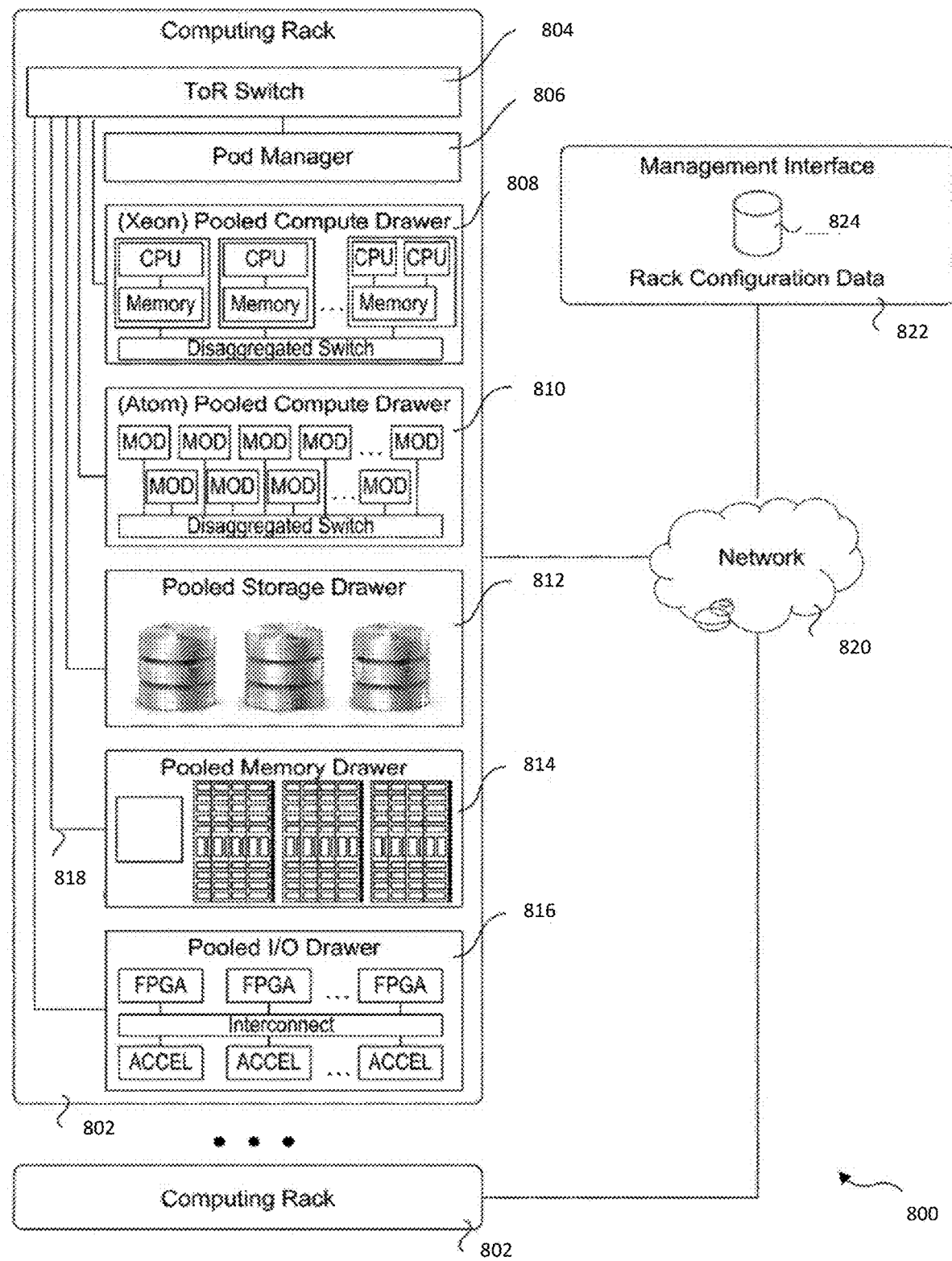
FIG. 8 illustrates an example computing environment.

FIG. 8 depicts an environment 800 includes multiple computing racks 802, each including a Top of Rack (ToR) switch 804, a pod manager 806, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link. In one embodiment high-speed link 818 comprises an 800 Gb/s SiPh optical link.

Multiple of the computing racks 802 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

Figure 9:
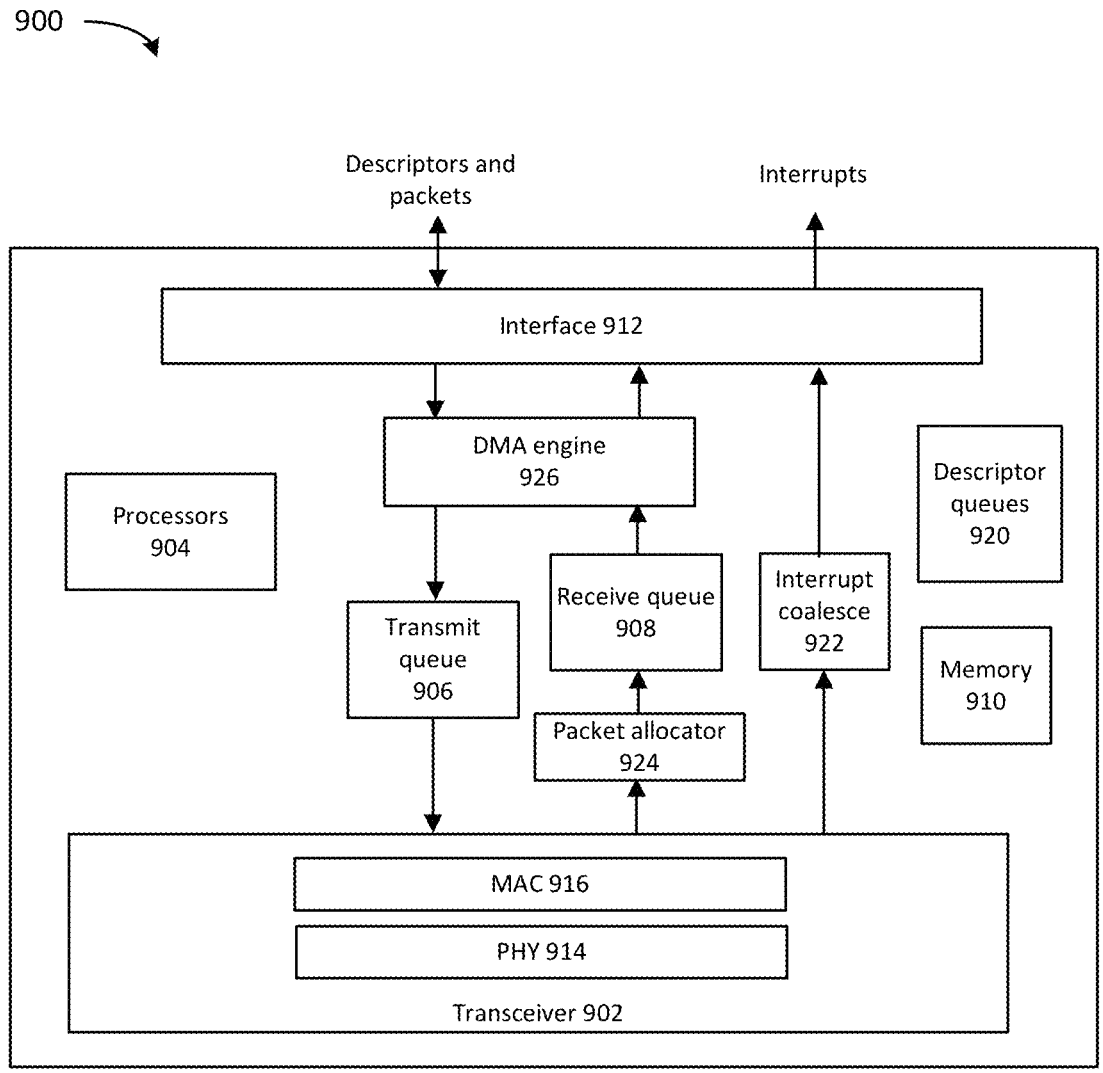
FIG. 9 illustrates an example network interface.

FIG. 9 depicts a network interface that can use embodiments or be used by embodiments. Various processors of network interface 900 can use techniques described herein to provision operating parameters of a core of processors 904. For example, if a first core of processors 904 performs packet processing and a second core of processor 904 performs a power management process, the second core can modify operating parameters of the first core in accordance with embodiments described herein.

Network interface 900 can include transceiver 902, processors 904, transmit queue 906, receive queue 908, memory 910, and bus interface 912, and DMA engine 926. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include physical layer (PHY) circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values. MAC circuitry 916 can be configured to process MAC headers of received packets by verifying data integrity, removing preambles and padding, and providing packet content for processing by higher layers.

Processors 904 can be any a combination of a: processor, core, graphics processing unit (GPU), field programmable gate array (FPGA), application specific integrated circuit (ASIC), or other programmable hardware device that allow programming of network interface 900. For example, processors 904 can provide for allocation or deallocation of intermediate queues. For example, a "smart network interface" can provide packet processing capabilities in the network interface using processors 904.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 926 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGS. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various systems or components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g. reset, while an updated value potentially includes a low logical value, e.g. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (e.g., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 includes a system comprising a processor unit comprising circuitry, the circuitry to determine whether an automation recommendation for a network is to be forwarded to a management system of the network; responsive to a determination to forward the automation recommendation, assess an impact of the automation recommendation; and perform an action with respect to the automation recommendation based on the impact.

Example 2 includes the subject matter of Example 1, and wherein determining whether the automation recommendation for the network is to be forwarded comprises determining whether forwarding of the automation recommendation would result in a maximum frequency of automation recommendations being exceeded.

Example 3 includes the subject matter of any of Examples 1 and 2, and wherein determining whether the automation recommendation for the network is to be forwarded comprises determining whether an automation recommendation type corresponding to the automation recommendation has previously been marked to be held pending approval by a human operator.

Example 4 includes the subject matter of any of Examples 1-3, and wherein determining whether the automation recommendation for the network is to be forwarded comprises determining whether an automation recommendation type corresponding to the automation recommendation has previously been marked to be automatically blocked.

Example 5 includes the subject matter of any of Examples 1-4, and wherein the impact is based on telemetry data of one or more platforms of the network that is collected within an evaluation window associated with the automation recommendation.

Example 6 includes the subject matter of any of Examples 1-5, and wherein the impact is based on one or more service level agreements associated with the network.

Example 7 includes the subject matter of any of Examples 1-6, and wherein the impact is based on probe data collected by a service assurance solution managed by an operator of the network.

Example 8 includes the subject matter of any of Examples 1-7, and wherein the action comprises marking an automation recommendation type corresponding to the automation recommendation to be held in the future.

Example 9 includes the subject matter of any of Examples 1-8, and wherein the action comprises marking an automation recommendation type corresponding to the automation recommendation to be blocked in the future.

Example 10 includes the subject matter of any of Examples 1-9, and wherein the action comprises initiating a ramping down of implementation of the automation recommendation.

Example 11 includes the subject matter of any of Examples 1-10, and wherein the action comprises sending a message about the automation recommendation to a human operator.

Example 12 includes the subject matter of any of Examples 1-11, and wherein the action comprises initiating a remediation of implementation of the automation recommendation.

Example 13 includes the subject matter of any of Examples 1-12, and wherein the action comprises placing the automation recommendation on hold pending approval by a human operator.

Example 14 includes the subject matter of any of Examples 1-13, and wherein the action comprises sending a message about the automation recommendation to a recommendation system from which the automation recommendation was received.

Example 15 includes the subject matter of any of Examples 1-14, and further including a recommendation system comprising a second processor unit to generate the automation recommendation.

Example 16 includes a method comprising determining whether an automation recommendation for a network is to be forwarded to a management system of the network; responsive to a determination to forward the automation recommendation, assessing an impact of the automation recommendation; and performing an action with respect to the automation recommendation based on the impact.

Example 17 includes the subject matter of Example 16, and wherein determining whether the automation recommendation for the network is to be forwarded comprises determining whether forwarding of the automation recommendation would result in a maximum frequency of automation recommendations being exceeded.

Example 18 includes the subject matter of any of Examples 16 and 17, and wherein determining whether the automation recommendation for the network is to be forwarded comprises determining whether an automation recommendation type corresponding to the automation recommendation has previously been marked to be held pending approval by a human operator.

Example 19 includes the subject matter of any of Examples 16-18, and wherein determining whether the automation recommendation for the network is to be forwarded comprises determining whether an automation recommendation type corresponding to the automation recommendation has previously been marked to be automatically blocked.

Example 20 includes the subject matter of any of Examples 16-19, and wherein the impact is based on telemetry data of one or more platforms of the network that is collected within an evaluation window associated with the automation recommendation.

Example 21 includes the subject matter of any of Examples 16-20, and wherein the impact is based on one or more service level agreements associated with the network.

Example 22 includes the subject matter of any of Examples 16-21, and wherein the impact is based on probe data collected by a service assurance solution managed by an operator of the network.

Example 23 includes the subject matter of any of Examples 16-22, and wherein the action comprises marking an automation recommendation type corresponding to the automation recommendation to be held in the future.

Example 24 includes the subject matter of any of Examples 16-23, and wherein the action comprises marking an automation recommendation type corresponding to the automation recommendation to be blocked in the future.

Example 25 includes the subject matter of any of Examples 16-24, and wherein the action comprises initiating a ramping down of implementation of the automation recommendation.

Example 26 includes the subject matter of any of Examples 16-25, and wherein the action comprises sending a message about the automation recommendation to a human operator.

Example 27 includes the subject matter of any of Examples 16-26, and wherein the action comprises initiating a remediation of implementation of the automation recommendation.

Example 28 includes the subject matter of any of Examples 16-27, and wherein the action comprises placing the automation recommendation on hold pending approval by a human operator.

Example 29 includes the subject matter of any of Examples 16-28, wherein the action comprises sending a message about the automation recommendation to a recommendation system from which the automation recommendation was received.

Example 30 includes at least one non-transitory machine readable storage medium having instructions stored thereon, the instructions when executed by a machine to cause the machine to determine whether an automation recommendation for a network is to be forwarded to a management system of the network; responsive to a determination to forward the automation recommendation, assess an impact of the automation recommendation; and perform an action with respect to the automation recommendation based on the impact.

Example 31 includes the subject matter of Example 30, and wherein determining whether the automation recommendation for the network is to be forwarded comprises determining whether forwarding of the automation recommendation would result in a maximum frequency of automation recommendations being exceeded.

Example 32 includes the subject matter of any of Examples 30-31, and wherein determining whether the automation recommendation for the network is to be forwarded comprises determining whether an automation recommendation type corresponding to the automation recommendation has previously been marked to be held pending approval by a human operator.

Example 33 includes the subject matter of any of Examples 30-32, and wherein determining whether the automation recommendation for the network is to be forwarded comprises determining whether an automation recommendation type corresponding to the automation recommendation has previously been marked to be automatically blocked.

Example 34 includes the subject matter of any of Examples 30-33, and wherein the impact is based on telemetry data of one or more platforms of the network that is collected within an evaluation window associated with the automation recommendation.

Example 35 includes the subject matter of any of Examples 30-34, and wherein the impact is based on one or more service level agreements associated with the network.

Example 36 includes the subject matter of any of Examples 30-35, and wherein the impact is based on probe data collected by a service assurance solution managed by an operator of the network.

Example 37 includes the subject matter of any of Examples 30-36, and wherein the action comprises marking an automation recommendation type corresponding to the automation recommendation to be held in the future.

Example 38 includes the subject matter of any of Examples 30-37, and wherein the action comprises marking an automation recommendation type corresponding to the automation recommendation to be blocked in the future.

Example 39 includes the subject matter of any of Examples 30-38, and wherein the action comprises initiating a ramping down of implementation of the automation recommendation.

Example 40 includes the subject matter of any of Examples 30-39, and wherein the action comprises sending a message about the automation recommendation to a human operator.

Example 41 includes the subject matter of any of Examples 30-40, and wherein the action comprises initiating a remediation of implementation of the automation recommendation.

Example 42 includes the subject matter of any of Examples 30-41, and wherein the action comprises placing the automation recommendation on hold pending approval by a human operator.

Example 43 includes the subject matter of any of Examples 30-42, and wherein the action comprises sending a message about the automation recommendation to a recommendation system from which the automation recommendation was received.

Example 44 includes a system comprising means to determine whether an automation recommendation for a network is to be forwarded to a management system of the network; means to responsive to a determination to forward the automation recommendation, assess an impact of the automation recommendation; and means to perform an action with respect to the automation recommendation based on the impact.

Example includes the subject matter of any of Examples 1-44, wherein the automation recommendation specifies an action to take with respect to a plurality of platforms of the network and is received from a recommendation system utilizing artificial intelligence to generate the automation recommendation.

What is claimed is:

1. A system comprising:
a processor unit comprising circuitry, the circuitry to:
determine whether an automation recommendation generated for a network is to be forwarded to a management system of the network, wherein the automation recommendation specifies an action to take with respect to a plurality of platforms of the network and is received from a recommendation system utilizing artificial intelligence to generate the automation recommendation;
responsive to a determination to forward the automation recommendation, assess an impact of the automation recommendation; and
perform an action with respect to the automation recommendation based on the impact, wherein the impact is based on telemetry data of one or more platforms of the network that is collected within an evaluation window associated with the automation recommendation.

2. The system of claim 1, wherein determining whether the automation recommendation for the network is to be forwarded is based on a number of automation recommendations forwarded within a time period.

3. The system of claim 1, wherein determining whether the automation recommendation for the network is to be forwarded comprises determining whether an automation recommendation type corresponding to the automation recommendation has previously been marked to be held pending approval by a human operator.

4. The system of claim 1, wherein determining whether the automation recommendation for the network is to be forwarded comprises determining whether an automation recommendation type corresponding to the automation recommendation has previously been marked to be automatically blocked.

5. The system of claim 1, wherein the impact is based on one or more service level agreements associated with the network.

6. The system of claim 1, wherein the impact is based on probe data collected by a service assurance solution managed by an operator of the network.

7. The system of claim 1, wherein the action comprises marking an automation recommendation type corresponding to the automation recommendation to be held in the future.

8. The system of claim 1, wherein the action comprises marking an automation recommendation type corresponding to the automation recommendation to be blocked in the future.

9. The system of claim 1, wherein the action comprises initiating a ramping down of implementation of the automation recommendation.

10. The system of claim 1, wherein the action comprises sending a message about the automation recommendation to a human operator.

11. The system of claim 1, wherein the action comprises initiating a remediation of implementation of the automation recommendation.

12. The system of claim 1, wherein the action comprises placing the automation recommendation on hold pending approval by a human operator.

13. The system of claim 1, wherein the action comprises sending a message about the automation recommendation to a recommendation system from which the automation recommendation was received.

14. The system of claim 1, further comprising a recommendation system comprising a second processor unit to generate the automation recommendation.

15. A method comprising:
determining whether an automation recommendation for a network is to be forwarded to a management system of the network, wherein the automation recommendation specifies an action to take with respect to a plurality of platforms of the network and is received from a recommendation system utilizing artificial intelligence to generate the automation recommendation;
responsive to a determination to forward the automation recommendation, assessing an impact of the automation recommendation; and
performing an action with respect to the automation recommendation based on the impact, wherein the impact is based on telemetry data of one or more platforms of the network that is collected within an evaluation window associated with the automation recommendation.

16. The method of claim 15, wherein determining whether the automation recommendation for the network is to be forwarded is based on a number of automation recommendations forwarded within a time period.

17. The method of claim 15, wherein determining whether the automation recommendation for the network is to be forwarded comprises determining whether an automation recommendation type corresponding to the automation recommendation has previously been marked to be held pending approval by a human operator.

18. At least one non-transitory machine readable storage medium having instructions stored thereon, the instructions when executed by a machine to cause the machine to:
determine whether an automation recommendation for a network is to be forwarded to a management system of the network, wherein the automation recommendation specifies an action to take with respect to a plurality of platforms of the network and is received from a recommendation system utilizing artificial intelligence to generate the automation recommendation;
responsive to a determination to forward the automation recommendation, assess an impact of the automation recommendation; and
perform an action with respect to the automation recommendation based on the impact, wherein the impact is based on telemetry data of one or more platforms of the network that is collected within an evaluation window associated with the automation recommendation.

19. The medium of claim 18, wherein determining whether the automation recommendation for the network is to be forwarded is based on a number of automation recommendations forwarded within a time period.

20. The medium of claim 18, wherein determining whether the automation recommendation for the network is to be forwarded comprises determining whether an automation recommendation type corresponding to the automation recommendation has previously been marked to be held pending approval by a human operator.

21. The medium of claim 18, wherein determining whether the automation recommendation for the network is to be forwarded comprises determining whether an automation recommendation type corresponding to the automation recommendation has previously been marked to be automatically blocked.

22. The medium of claim 18, wherein the action comprises marking an automation recommendation type corresponding to the automation recommendation to be held in the future.

\* \* \* \* \*